(12) United States Patent
Valeev et al.

(10) Patent No.: US 10,559,226 B2
(45) Date of Patent: Feb. 11, 2020

(54) DRIVE FOR GENERATING FORCE-RELATED TACTILE FEEDBACK ON AN INSTRUMENT

(71) Applicant: EIDOS-MEDICINE LLC, Kazan, Republic of Tatarstan (RU)

(72) Inventors: Lenar Nailevich Valeev, Kazan (RU); Ramil Khatyamovich Zaynullin, Kazan (RU); Vladimir Aleksandrovich Andryashin, Kazan (RU); Aleksandr Alekseevich Litvinov, Kazan (RU); Ramil Talgatovich Gaynutdinov, Moscow (RU); Aleksandr Viktorovich Lushanin, Kazan (RU); Mikhail Evgenievich Timofeev, Moscow (RU); Vagiz Kamilievich Yagafarov, Kazan (RU); Leonid Anatolievich Kornilov, Kazan (RU); Aleksey Leonidovich Larionov, Republic of Tatarstan (RU); Azat Rinatovich Khayrullin, Kazan (RU); Igor Vladimirovich Tsvetov, Kazan (RU)

(73) Assignee: EIDOS-MEDICINE LLC, Kazan, Republic of Tatarstan (RU)

( * ) Notice: Subject to any disclaimer, the term of this patent is extended or adjusted under 35 U.S.C. 154(b) by 691 days.

(21) Appl. No.: 15/039,734

(22) PCT Filed: Nov. 18, 2014

(86) PCT No.: PCT/RU2014/000875
§ 371 (c)(1),
(2) Date: May 26, 2016

(87) PCT Pub. No.: WO2015/080625
PCT Pub. Date: Jun. 4, 2015

(65) Prior Publication Data
US 2017/0004732 A1   Jan. 5, 2017

(30) Foreign Application Priority Data

Nov. 29, 2013   (RU) .............................. 2013153307

(51) Int. Cl.
*G09B 19/24*   (2006.01)
(52) U.S. Cl.
CPC .................................. *G09B 19/24* (2013.01)
(58) Field of Classification Search
CPC ....... G09B 19/24; G09B 23/28; G09B 23/285
(Continued)

(56) References Cited

U.S. PATENT DOCUMENTS 3,870,914 A * 3/1975 Walker .................. H02K 5/128
                                                          310/219
5,355,373 A * 10/1994 Salmon .................. H01F 7/145
                                                          29/597

(Continued)

FOREIGN PATENT DOCUMENTS

DE        10304736 B3    9/2004
EA        200201143 A1   4/2003
(Continued)

OTHER PUBLICATIONS

International Search Report of PCT/RU2014/000875 dated Feb. 19, 2015.
(Continued)

*Primary Examiner* — Xuan M Thai
*Assistant Examiner* — Sadaruz Zaman
(74) *Attorney, Agent, or Firm* — Muncy, Geissler, Olds & Lowe, P.C.

(57) ABSTRACT

The invention relates to the devices providing the tactual sensation by the operation with the elongated instruments in the medical simulators. In the drive the counteraction of the instrument motion is being performed contact-free that
(Continued)

allows to increase the precision of the tactual sensations set by the program. An instrument's longitudinal movement device and a regulated braking mechanism are realized together in the form of the linear electromagnetic motor 1, and the instrument's rotational movement device and the regulated braking mechanism are realized together in the form of the electromagnetic motor 2, where the elongated instrument 9 with the magnets inside is located inside the linear electromagnetic motor 1, performing the regulated longitudinal motion of the elongated instrument 9, interacting with the rotor of the electromagnetic motor 2.

8 Claims, 2 Drawing Sheets

(58) Field of Classification Search
USPC .......................................................... 434/262
See application file for complete search history.

(56) References Cited

U.S. PATENT DOCUMENTS

| | | | | |
|---|---|---|---|---|
| 5,497,038 | A * | 3/1996 | Sink | H02K 41/03 104/290 |
| 6,697,048 | B2 * | 2/2004 | Rosenberg | G01B 5/008 345/161 |
| 7,815,436 | B2 * | 10/2010 | Cunningham | G09B 23/285 345/158 |
| 7,944,433 | B2 * | 5/2011 | Schena | G05G 9/047 345/161 |
| 8,480,406 | B2 * | 7/2013 | Alexander | G09B 23/285 434/262 |
| 8,764,448 | B2 | 7/2014 | Yang et al. | |
| 2002/0168618 | A1 * | 11/2002 | Anderson | A61F 2/07 434/262 |
| 2004/0091845 | A1 | 5/2004 | Azerad et al. | |
| 2005/0277096 | A1 * | 12/2005 | Hendrickson | G09B 23/285 434/262 |
| 2006/0046235 | A1 | 3/2006 | Alexander et al. | |
| 2007/0063971 | A1 * | 3/2007 | Vecerina | G09B 23/285 345/156 |
| 2008/0238635 | A1 | 10/2008 | Klinghult | |
| 2009/0091724 | A1 * | 4/2009 | Kimura | G03F 7/70758 355/53 |
| 2010/0305928 | A1 * | 12/2010 | Cohen | G06F 19/321 703/11 |
| 2013/0224710 | A1 | 8/2013 | Yang et al. | |
| 2013/0328512 | A1 * | 12/2013 | Ozaki | B60L 3/0061 318/453 |
| 2015/0288314 | A1 * | 10/2015 | Nonaka | H02K 29/03 318/724 |

FOREIGN PATENT DOCUMENTS

| | | |
|---|---|---|
| EP | 2140336 A1 | 1/2010 |
| KR | 10-2013-0128673 A | 11/2013 |
| RU | 2461866 C2 | 9/2012 |
| WO | 2008116505 A1 | 10/2008 |

OTHER PUBLICATIONS

Extended European Search Report issued in the corresponding EP application (No. 14865874.3) dated Aug. 8, 2016.

* cited by examiner

DRIVE FOR GENERATING FORCE-RELATED TACTILE FEEDBACK ON AN INSTRUMENT

TECHNICAL FIELD

The invention relates to the medical equipment, to the devices providing the tactual sensation by the operation with the elongated instruments. It can be used by simulation of a medical intervention, when catheters and other instruments are being inserted through the inlet for interaction with the virtual environment, primary in medical simulators during the educational process.

BACKGROUND ART

Force feedback for input device invention (Russian Patent NO. 2461866, IPC G06F 3/01, 2007. (Patent Document 1)) is known. The invention relates to the devices of input and haptic feedback to the finger provision by the data input to the mobile terminals.

The input device is equipped with a unit configured to detect finger touch and a unit configured to provide haptic feedback to the finger in order to confirm switching on of the touch surface of the input device. The haptic feedback provision unit has three elongated members made from shape memory metal. Each of the members is arranged so as to interact with one displacement unit and become shorter in another direction than the rest of the elongated members. The device provides the haptic feedback to the finger by data input.

The device cannot be used for elongated medical instruments (catheters, etc.), as it provides slight displacement (3% to 5% of the member's length with shape memory), whereas in real medical instruments displacements up to the several tens of the centimeters are required.

"Robotic device for use in image-guided robot assisted surgical training technical" solution (US 20130224710 A1 (Application Date: Jan. 9, 2010) (Patent Document 2)) is known. The automated device records the intervention course executed by the master surgeon and replays it for a trainee studying these skills, including the tactual sensation. The device has 4 degrees of freedom. Translational motion of the instrument is executed by the gear train, toothed bar is located along the full length of the instrument (FIGS. 3 and 6 of Patent Document 2). The rotation of the instrument is executed by two spherical arches (FIGS. 2 and 3 and position 328 of Patent Document 2). A disadvantage of the device is in the difficulty of its manufacturing.

An actuator for an elongated member for a force feedback generating device technical solution (US 20070063971 A1 (Application Date: Dec. 3, 2004) (Patent Document 3)) is the closest in terms of technical solution and gained results and it was taken as a prior art. The actuator includes elongated instrument's longitudinal and rotational movement devices with regulated braking mechanisms and instrument motion sensors. Longitudinal and rotational movement devices are realized in the form of electromagnetic actuators with rolls. A processor continuously receives the data on the instrument movements from the motion sensors and chooses the calculated braking power as the instrument moves. The device can be used for provision of the realistic sensation by the medical intervention simulation where catheters or other instruments are being inserted through the inlet for interaction with the virtual environment. The main braking element of the actuator for a force feedback generating device is a friction between the rolls and the instrument. Surfaces of the rolls contacting to the instrument will be worn-out during the work of the braking mechanisms that will lead to the change of the braking force according to the set values, these changes will take place permanently that will lead to the change of the set values of the tactual sensations.

CITATION LIST

Patent Document(s)

Patent Document 1: Russian Patent NO. 2461866
Patent Document 2: US20130224710 A1
Patent Document 3: US20070063971 A1

DISCLOSURE OF INVENTION

Problem to be Solved by the Invention

Engineering task that is being solved is the increase of the tactual sensations set by the program and the drive enhancement.

Means for Solving Problem

According to the invention, the set task is being solved in the following way: a generating forcing drive of haptic feedback to an elongated instrument includes elongated instrument's longitudinal and rotational movement devices with regulated braking mechanisms and instrument motion sensors, wherein the elongated instrument's longitudinal movement device and the regulated braking mechanism are realized together in a form of a linear electromagnetic motor, the elongated instrument's rotational movement device and the regulated braking mechanism are realized together in a form of an electromagnetic motor, and the elongated instrument with the magnets inside is located in the linear electromagnetic motor, performing the regulated longitudinal movement of the elongated instrument interacting with the rotor of the electromagnetic motor of the rotational movement, whereas the motors of the longitudinal and rotational movement are located coaxial.

MODE FOR CARRYING OUT THE INVENTION

Figure 1:
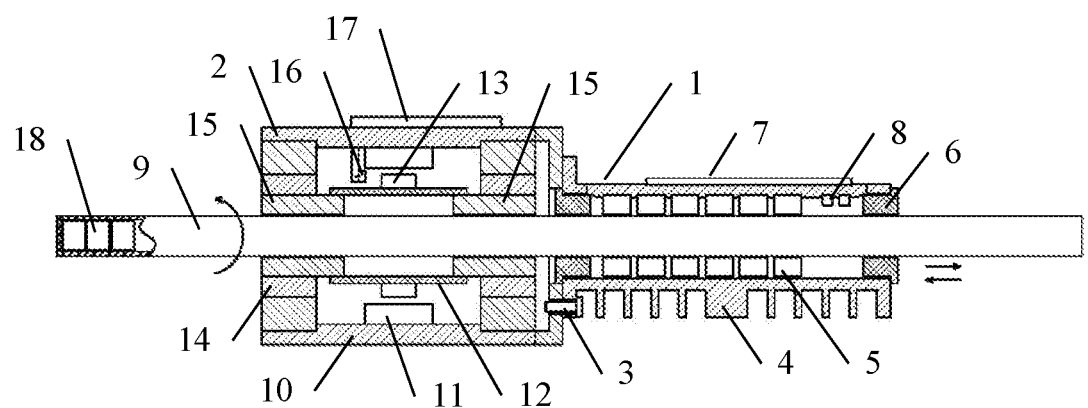
FIG. 1 represents the general view of generating forcing drive of haptic feedback to the instrument.
Figure 2:
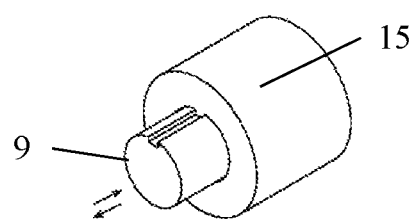
FIG. 2 represents the spline joint of the elongated instrument with the rotor guide bushing, where the elongated instrument with a groove along the whole length is intermeshing the guide bushing tooth.
Figure 3:
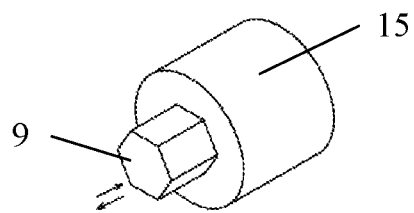
FIG. 3 represents the spline joint of the elongated instrument to the rotor's guide bushing, where the interacting surfaces are implemented in the form of the polyhedron's surface.
Figure 4:
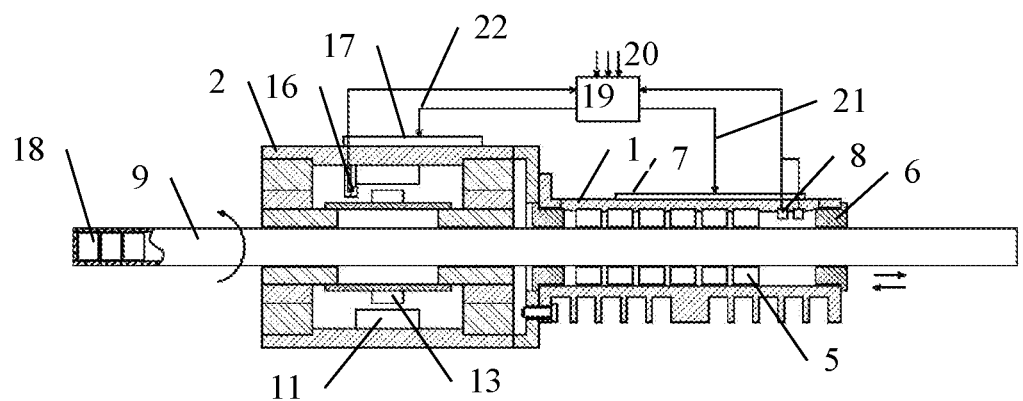
FIG. 4 represents the application variant of the forcing drive of haptic feedback

The generating forcing drive of haptic feedback to the instrument contains an instrument's longitudinal movement device and a regulated braking mechanism realized together in the form of the linear electromagnetic motor 1, and a rotational movement device and a regulated braking mechanism realized together in the form of the electromagnetic motor (FIG. 1). Linear electromagnetic motor 1 and electromagnetic motor 2 are located coaxial and connected with the bolts 3. Constant-lead linear motor coils 5, creating the travelling sine electromagnetic field when operating, are located inside the body frame 4 of the linear electromagnetic motor 1. Plain bearings 6 are located on the faces of the linear electromagnetic motor 1. Linear motor control unit 7 and instrument motion sensors 8 are located on the body frame 4 of the linear electromagnetic motor 1. Electromagnetic motor 2 contains stator body frame 10, inside of which the stator coils 11 are located, rotor magnets 13 are located on the rotor body frame 12. Rotation bearings 14 and guide bushing 15 shrunk in the rotation bearings 14, which are rigidly connected to the rotor body frame 12, are located on the faces of the electromagnetic motor 2. Inside the stator body frame 10 instrument's 9 rotational motion sensors 16 are located. Motor control unit 17 is located on the body frame of the electromagnetic motor 2. Elongated instrument 9 with the magnets 18 inside is located inside the linear electromagnetic motor 1 and is interacting with the rotor of the electromagnetic motor 2, for example, with spline joint what allows transferring torque and longitudinal moving of the instrument. FIGS. 2 and 3 represent the variants of the spline joint of the rotor guide bushing 15 with the instrument 9. FIG. 2 represents the elongated instrument 9 with a groove along the whole length that is intermeshing the tooth of the guide bushing 15. FIG. 3 represents the instrument 9 and the internal surface of the guide bushing 15 realized in the form of the polyhedron. FIG. 4 represents the example of the specific realization of the drive where the interface unit 19 implemented on the base of a microprocessor is connected to the instrument motion sensor 8, instrument's rotational motion sensors 16, linear motor control unit 7 and motor control unit 17.

FIG. 4 represents the drive's specific realization example. The generating forcing drive of haptic feedback to an instrument as follows: when the motors 1 and 2 are off, the elongated instrument 9 can move and rotate freely, only the tracking of its motion and rotation is performed by the corresponding sensors 8 and 16. Generation of the haptic feedback is performed by the creation of the stated forces suppressing the instrument motion. Instrument position data can be used in simulated virtual environment where the position of the virtual instrument will be synchronized with the instrument position in the drive. Stated braking signals 20 from ECM (is not represented), for example, proceed to the interface unit 19, and the control signals 21 and 22 proceed from the interface unit 19 to the motor control units 7 and 17 and correspondingly. When signal 21 is set from the interface unit 19 to the motor control unit 7, the motor control unit 7 generates the corresponding signal for setting the necessary voltage to the linear motor coils 5. The magnetic field, occurring in the linear motor coils 5, interacts with the magnets 18 in the instrument 9 and creates the force, suppressing (braking) the instrument motion performed by an operator. The braking force is regulated with the voltage set by the linear motor control unit 7 to the linear motor coils 5. The braking force by the instrument rotation 9 in the electromagnetic motor 2 is created in a similar manner. Control signal 22 is set from the interface unit 19 to the motor control unit 17, the motor control unit 17 sets the corresponding voltage to the stator coils 11. The magnetic field, occurring in the stator coils 11, interacts with the magnets 13 of the rotor 12. The resultant magnetic field of the stator coils 11 turns the rotor 12 and the guide bushing 15 through the rotation bearings 14 together with the instrument 9 creating the rotation force to the instrument 9, that force suppresses the further instrument motion by an operator and creates the tactual sensation on the instrument 9. The value of the instrument rotation braking force is regulated by the motor control unit 17 by the change of the voltage set to the stator coils 11. Since the linear motor coils 5 are solenoids, the even magnetic field is being created inside of them, whereupon the effect to the instrument is equal all round and plain bearings 6 are under light load. The friction force in the drive is constant by the instrument's 9 free motion, and it preserves the same by the braking with the electromagnetic field. In the examined drive, the counteraction of the instrument motion is being performed contact-free that allows to increase the precision of the tactual sensations set by the program.

The generating forcing drive of haptic feedback to an instrument allows performing linear motion of the instrument with its rotation that was impossible in the prototype. The drive has two degrees of freedom that significantly expand the technical opportunities of the device usage in the medical simulators.

The invention claimed is:

1. A generating forcing drive of haptic feedback to an elongated instrument comprising:

elongated instrument's longitudinal and rotational movement devices with regulated braking mechanisms and instrument motion sensors, wherein the elongated instrument's longitudinal movement device and the regulated braking mechanism are realized together in a form of a linear electromagnetic motor, the elongated instrument's rotational movement device and the regulated braking mechanism are realized together in a form of a rotation electromagnetic motor, and the elongated instrument with magnets inside is located in the linear electromagnetic motor, performing the regulated longitudinal movement of the elongated instrument interacting with a rotor of the rotation electromagnetic motor of the rotational movement, whereas the motors of the longitudinal and rotational movement are located coaxial, constant-lead linear motor coils, creating a travelling sine magnetic field when the elongated instrument makes the longitudinal movement, are located inside a body frame of the linear electromagnetic motor, the magnetic field, occurring in the linear motor coils, interacts with the magnets in the elongated instrument and creates a linear braking force, the linear braking force is regulated with a voltage set by a linear motor control unit to the linear motor coils, stator coils, creating a magnetic field when the elongated instrument makes the rotational movement, are located surrounding a rotor of the rotation electromagnetic motor, the rotor having magnets, and a rotational braking force by a rotation of the elongated instrument in the rotation electromagnetic motor is created by the magnetic field, which occurs in the stator coils of the electromagnetic motor, interacting with the magnets of the rotor of the rotation electromagnetic motor such that the magnetic field of the stator coils turns the rotor and a guide bushing, which is fixed to the rotor, together with the elongated instrument creating the rotation force to the elongated instrument.

2. The generating forcing drive according to claim 1, further comprising:

a rotational motor control unit (17) that supplies a voltage set to the rotor of the rotation electromagnetic motor (2) to control, wherein the rotational braking force is regulated with the voltage set supplied from the linear motor control unit.

3. The generating forcing drive according to claim 2, further comprising:
  the elongated instrument (9) is in a tube shape having a hollow inside, wherein
  the elongated instrument extends in an axis,
  the hollow has an inner diameter that is constant in the axis,
  the magnets (18) of the elongated instrument all have an identical shape, and are placed inside the hollow to align along the axis such that the hollow is filled with the magnets,
  the linear electromagnetic motor and the rotation electromagnetic motor are adjacent side by side in the axis, being penetrated by the elongated instrument such that the longitudinal movement by the linear electromagnetic motor is along the axis, and the rotational movement by the rotation electromagnetic motor is around the axis.

4. The generating forcing drive according to claim 3, wherein
  the linear motor coils (5) and the elongated instrument are arranged coaxial, and
  the stator coils (11) and the elongated instrument are arranged coaxial.

5. The generating forcing drive according to claim 4, wherein
  the magnets (18) of the elongated instrument are all shorter than the magnets (13) of the rotor with respect to the axis.

6. The generating forcing drive according to claim 4, wherein
  a groove is formed on an outer surface of the elongated instrument, which entirely extends in the axis,
  the guide bushing (15) of the rotation electromagnetic motor has a projection portion to mate with the groove of the elongated instrument such that the rotational braking force is conveyed to the elongated instrument by rotating the guide bushing around the axis.

7. The generating forcing drive according to claim 4, wherein
  seen from the axis, an outer surface of the elongated instrument has multiple corners, and
  the guide bushing (15) of the rotation electromagnetic motor has an inner surface that has as many corners as the elongated instrument has to fit with the outer surface of the elongated instrument such that the rotational braking force is conveyed to the elongated instrument by rotating the guide bushing around the axis.

8. The generating forcing drive according to claim 4, wherein
  the guide bushing is rotatable around the axis, and
  an empty space is arranged between the guide bushing and the linear motor coils such that the guide bushing is slidable back and forth in the axis together with the elongated instrument.

* * * * *